United States Patent
Latif et al.

(10) Patent No.: US 10,443,696 B1
(45) Date of Patent: Oct. 15, 2019

(54) NO-BACK BRAKE CREEP INHIBITOR

(71) Applicant: Rockwell Collins, Inc., Cedar Rapids, IA (US)

(72) Inventors: Rana Kamran Latif, Corona, CA (US); Mark A. Webster, Chino Hills, CA (US); Kerry R. Kohuth, Huntington Beach, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 459 days.

(21) Appl. No.: 15/227,624

(22) Filed: Aug. 3, 2016

(51) Int. Cl.
*F16H 25/00* (2006.01)
*F16H 25/24* (2006.01)
*F16F 15/16* (2006.01)
*F16F 9/53* (2006.01)
*F16F 9/12* (2006.01)
*B64C 13/28* (2006.01)
*B64C 5/02* (2006.01)
*B64C 5/10* (2006.01)
*F16H 25/22* (2006.01)

(52) U.S. Cl.
CPC ........... *F16H 25/2454* (2013.01); *B64C 5/02* (2013.01); *B64C 5/10* (2013.01); *B64C 13/28* (2013.01); *F16F 9/12* (2013.01); *F16F 9/535* (2013.01); *F16F 15/16* (2013.01); *F16H 25/2204* (2013.01)

(58) Field of Classification Search
CPC ... F16H 25/2454; F16H 25/2204; B64C 5/10; B64C 5/02; B64C 13/28; F16F 9/12; F16F 9/535; F16F 15/16
USPC ........................................ 74/89.39; 244/99.9
See application file for complete search history.

(56) References Cited

U.S. PATENT DOCUMENTS

| 5,582,390 | A | 12/1996 | Russ | |
|---|---|---|---|---|
| 6,325,331 | B1 * | 12/2001 | McKeown | B64C 13/08 244/220 |
| 7,293,524 | B2 | 11/2007 | Darby | |
| 7,938,473 | B2 * | 5/2011 | Paton | B60J 5/101 74/89.34 |
| 8,109,163 | B2 * | 2/2012 | Hudson | B64C 13/28 74/89.25 |
| 8,291,782 | B1 | 10/2012 | Shaheen et al. | |
| 8,918,291 | B2 | 12/2014 | Tallot et al. | |
| 9,776,483 | B2 * | 10/2017 | Shchokin | B60J 5/107 |
| 9,976,332 | B2 * | 5/2018 | Scheuring | E05F 15/622 |

(Continued)

FOREIGN PATENT DOCUMENTS

| EP | 0 960 811 | 12/1999 |
|---|---|---|
| EP | 0 983 937 | 3/2000 |
| EP | 1 245 867 | 10/2002 |

OTHER PUBLICATIONS

Bahrami, A., Airworthiness Directives; Bombardier, Inc. Model BD-100-1A10 (Challenger 300) Airplanes, Department of Transportation, Federal Aviation Administration, Federal Register, vol. 77, No. 66, Apr. 5, 2012, 3 pages.

*Primary Examiner* — Victor L Macarthur
(74) *Attorney, Agent, or Firm* — Donna P. Suchy; Daniel M. Barbieri

(57) ABSTRACT

A system for inhibiting no-back brake device creep includes a motor, a ballscrew assembly coupled to the motor, a no-back brake device coupled to the ballscrew assembly, and at least one damper coupled to the ballscrew assembly. The damper varies a damping characteristic based on an operational state of the motor.

14 Claims, 2 Drawing Sheets

(56) References Cited

U.S. PATENT DOCUMENTS

| | | | | |
|---|---|---|---|---|
| 10,017,243 B2* | 7/2018 | Moser | ............... | B64C 13/50 |
| 10,179,643 B2* | 1/2019 | Nfonguem | ............ | F16D 37/008 |
| 2008/0072695 A1* | 3/2008 | Hudson | ............... | B64C 13/28 |
| | | | | 74/89.25 |
| 2009/0200830 A1* | 8/2009 | Paton | ............... | B60J 5/101 |
| | | | | 296/146.8 |
| 2010/0252789 A1* | 10/2010 | Watanabe | ............ | F16H 25/2015 |
| | | | | 254/98 |
| 2011/0127375 A1 | 6/2011 | Tallot et al. | | |
| 2015/0083853 A1* | 3/2015 | Moser | ............... | B64C 13/50 |
| | | | | 244/99.3 |
| 2015/0376929 A1* | 12/2015 | Scheuring | ............ | E05F 15/622 |
| | | | | 74/89.38 |
| 2016/0144694 A1* | 5/2016 | Shchokin | ............ | B60J 5/107 |
| | | | | 296/146.4 |
| 2016/0355253 A1* | 12/2016 | Nfonguem | ............ | F16D 37/008 |

* cited by examiner

NO-BACK BRAKE CREEP INHIBITOR

BACKGROUND

The inventive concepts disclosed herein relate generally to inhibiting creep in no-back brake devices, and more specifically, to systems and methods for inhibiting creep of a no-back brake device for a stabilizer actuator system.

Aircraft typically utilize horizontal stabilizers that pivot relative to the fuselage of the aircraft. The horizontal stabilizer is adjusted, or trimmed, by way of an actuator. Some actuators include a ballscrew that extends from a primary gimbal on the aircraft fuselage to a ballnut coupled to the horizontal stabilizer. Rotation of the ballscrew causes a corresponding upward or downward movement of the ballnut along the ballscrew, thereby enabling upward and downward adjustment of the horizontal stabilizer. The ballscrew is typically rotated by way of a motor (e.g., an electric or hydraulic motor), which may be used to position the horizontal stabilizer in a desired position during take-off, cruising, landing, etc.

Actuator systems such as horizontal stabilizer trim actuators may use no-back brake devices to avoid unwanted movement of the actuator. The no-back brake device avoids undesirable movement of the horizontal stabilizer by resisting movement of the ballscrew upon which the ballnut, and in turn the horizontal stabilizer, moves.

During flight, aerodynamic loads and vibrations act upon the horizontal stabilizer, and these loads are transmitted to the ballscrew assembly. A typical no-back brake device resists movement of the ballscrew assembly arising from aerodynamic loads in both an upward and downward direction. However, excessive vibration may result in creep, or movement, of the ballscrew assembly, even with usage of the no-back brake assembly.

SUMMARY

In one aspect, embodiments of the inventive concepts disclosed herein are directed to a system for inhibiting no-back brake device creep, including a motor, a ballscrew assembly coupled to the motor, a no-back brake device coupled to the ballscrew assembly, and at least one damper coupled to the ballscrew assembly. The damper is configured to vary a damping characteristic based on an operational state of the motor.

In a further aspect, embodiments of the inventive concepts disclosed herein are directed to a system for inhibiting no-back brake device creep, including a motor, a ballscrew assembly coupled to the motor, a no-back brake device coupled to the ballscrew assembly, at least one damper coupled to the ballscrew assembly, and a control module. The control module includes a processor coupled with a non-transitory processor-readable medium storing processor-executable code for causing the processor to monitor a state of the motor, and vary a damping characteristic of the damper based on the state of the motor.

In a further aspect, embodiments of the inventive concepts disclosed herein are directed to a method for inhibiting creep. The method includes engaging a motor to an active mode to rotate a ballscrew assembly, while the motor is in the active mode, maintaining at least one damper coupled to the ballscrew assembly in a first state to provide a first viscous drag to the ballscrew assembly, disengaging the motor to a standby mode, and while the motor is in the standby mode, maintaining the damper in a second state to provide a second viscous drag different from the first viscous drag to the ballscrew assembly.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
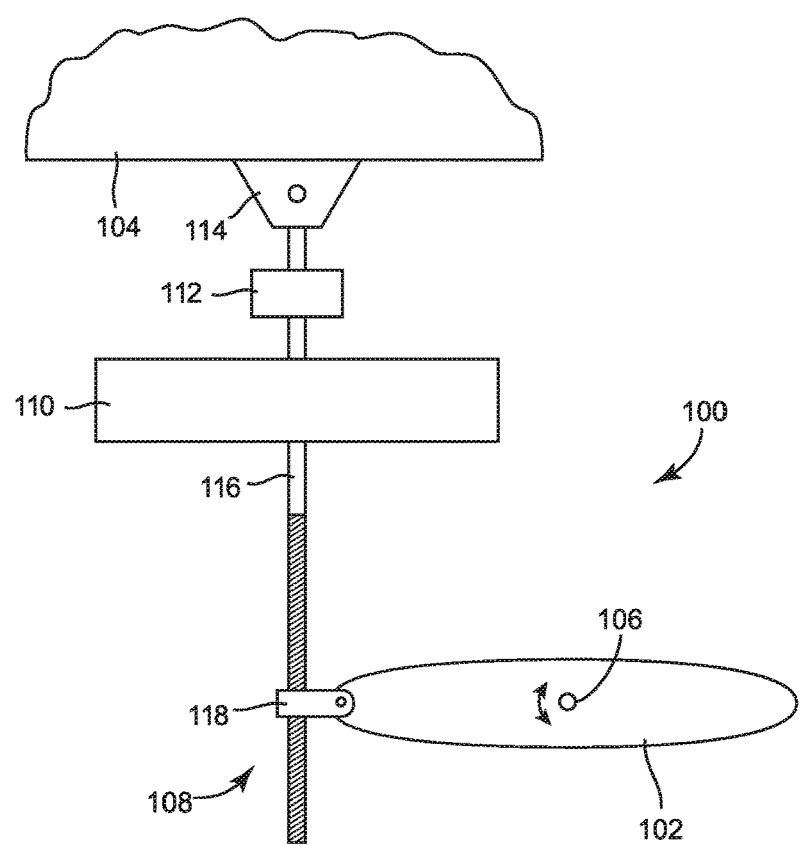
FIG. 1 is a schematic representation of an exemplary embodiment of a stabilizer system according to the inventive concepts disclosed herein.
Figure 2:
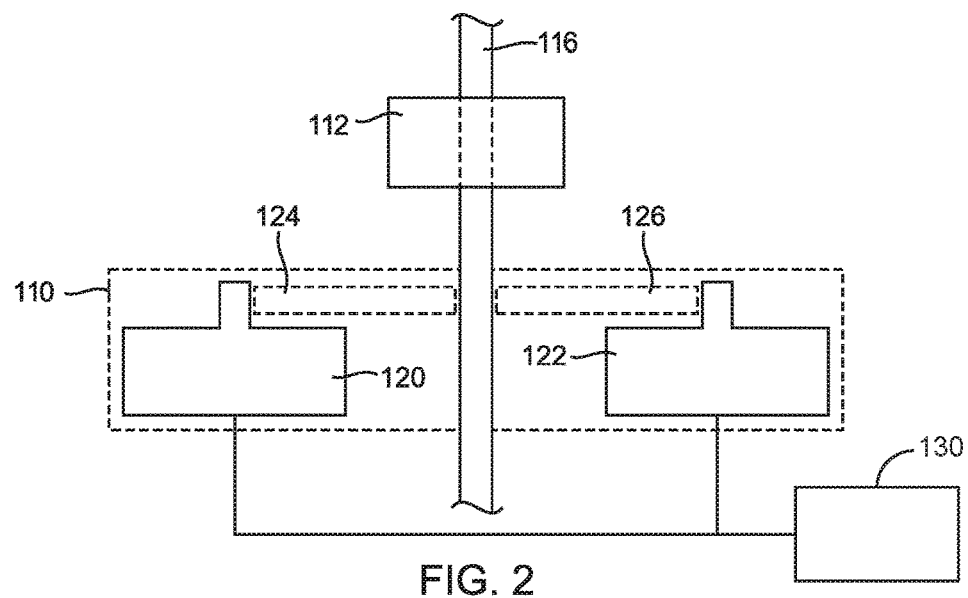
FIG. 2 is a schematic representation of an exemplary embodiment of a portion of the stabilizer system of FIG. 1 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to inhibiting creep in a stabilizer actuator system. The inventive concepts disclosed herein can be used in any type of environment. While certain examples and embodiments of the inventive concepts disclosed herein are described with respect to an aircraft, it will be appreciated that other applications may use and benefit from the inventive concepts disclosed herein.

Referring to the figures generally, embodiments of the inventive concepts disclosed herein are related to inhibiting creep in no-back brake devices used in stabilizer applications (e.g., horizontal stabilizer applications) or other applications. According to various embodiments, a damper is operatively coupled to a ballscrew assembly to provide variable damping to the ballscrew assembly, in addition to the braking forces normally applied by a no-back brake device also operatively coupled to the ballscrew assembly. During operation of the ballscrew assembly, the damper is configured to provide minimal damping and enable relatively free adjustment of the ballscrew assembly. During periods of non-operation (e.g., while the ballscrew assembly is intended to maintain a desired position), the damper is configured to provide a relatively higher damping and resist undesired movement (e.g., creep) of the ballscrew assembly that may otherwise occur even with use of a no-back brake device. In some embodiments, the variable damper is a rotary magnetorheological damper. It is to be understood that other suitable variable dampers may be utilized with the inventive concepts disclosed herein.

Referring now to FIG. 1, an exemplary embodiment of a stabilizer system 100 is shown according to the inventive concepts disclosed herein. The stabilizer system 100 includes a stabilizer 102 (e.g., a horizontal stabilizer, an adjustable member or structure, etc.) that is adjustable relative to an aircraft fuselage 104 or another similar component. In one embodiment, the stabilizer system 100 provides adjustment of the stabilizer 102 though rotation of the stabilizer 102 about a pivot 106.

The stabilizer system 100 further includes a ballscrew assembly 108, an actuator mechanism 110, a no-back brake device 112, and a primary gimbal 114. The ballscrew assembly 108 includes a ballscrew 116 and a ballnut 118. The stabilizer 102 is coupled to the fuselage 104 via the ballscrew assembly 108. In one embodiment, the stabilizer 102 is coupled to the ballnut 118, and the primary gimbal 114 is coupled to the ballscrew 116. The actuator mechanism 110 and the no-back brake device 112 are coupled to the ballscrew 116. As discussed in greater detail below, the actuator mechanism 110 acts to rotate the ballscrew 116, causing the ballnut 118 to translate along the ballscrew 116, and in turn causing the stabilizer 102 to rotate about the pivot 106 in a direction dependent on the direction of rotation of the ballscrew 116. The no-back brake device 112 acts to resist undesired movement of the ballscrew 116 resulting from aerodynamic forces acting upon the stabilizer 102 or other components of the system 100.

The actuator mechanism 110 is configured to control the position and movement of the stabilizer 102. In one embodiment, the actuator mechanism includes a motor 120, a damper 122, a motor gear train 124, and a damper gear train 126. The motor 120 is operatively coupled to the ballscrew 116 via the motor transmission or gear train 124. The damper 122 is operatively coupled to the ballscrew 116 via the damper transmission or gear train 126. The motor gear train 124 and the damper gear train 126 collectively form a gear train assembly (e.g., a transmission assembly) that operatively couples the motor 120 and the damper 122 to the ballscrew 116. Each of the motor gear train 124 and the damper gear train 126 may include one or more gears or other transmission components to transmit power, damping forces, etc., between the motor 120 and the damper 122 and the ballscrew 116. The motor 120 acts to rotate the ballscrew 116 to cause translational movement of the ballnut 118 along the ballscrew 116. The damper 122 acts as a type of shock absorber, to resist rotational movement of the ballscrew 116 when the ballscrew 116 is not being acted upon by the motor 120. The damper 122 supplements the no-back brake device 112 in ensuring that the ballscrew 116, and therefore the stabilizer 102, remain in a desired position. In some embodiments, the damper 122 is provided as part of the motor 120 (e.g., as a single integrated device or assembly).

The motor 120 is in one embodiment an electric motor configured to operate based on a motor current and rotate the ballscrew 116 with an appropriate gear ratio via the motor gear train 124, thereby providing a desired adjustment of the stabilizer 102. In an alternative embodiment, the motor 120 is a hydraulic motor and may be coupled to the ballscrew 116 via a differential with an appropriate gear ratio. In further embodiments, other types of motors 120 may be utilized in connection with the system 100.

The no-back brake device 112 provides a force resisting rotation of the ballscrew 116 to maintain the stabilizer 102 in a desired position. Under normal operating conditions, when the stabilizer system 100 is set to a desired position and in "standby" mode, the no-back brake device 112 may be effective at preventing undesired movement of the stabilizer 102. One example of a no-back brake device may be found in U.S. application Ser. No. 14/788,678, filed Jun. 30, 2015, which is incorporated herein by reference in its entirety. In environments subject to vibrations, and even with use of the no-back brake device 112, the ballscrew 116 may tend to creep (e.g., rotate) due to the vibrations, thereby allowing undesired movement of the stabilizer 102. As discussed in greater detail below, the damper 122 is configured to inhibit such creep associated with the stabilizer system 100 under conditions subject to vibrations.

In general, the damper 122 acts as a shock absorber by providing viscous drag, or friction, to the ballscrew 116 via the damper gear train 126. In one embodiment, the damper 122 is configured to vary a damping characteristic based on an operational state of the actuator mechanism 110 or the motor 120. For example, when the actuator mechanism 110 or motor 120 is an active mode or state (e.g., in a state usable to rotate the ballscrew 116), the damper 122 may be configured to provide a relatively low viscous drag, and when the actuator mechanism 110 or the motor 120 is inactive, or in a standby mode or state, the damper 122 may be configured to provide a relatively high viscous drag. The drag or frictional force provided by damper 122 is transmitted to the ballscrew 116 via damper gear train 126.

In one embodiment, the damper 122 is a magnetorheological (MR) damper. MR dampers are dampers that utilize MR fluid controlled by a magnetic field, typically produced by an electromagnet. By adjusting the power supplied to the electromagnet, the MR damper can provide a relatively higher or lower viscous drag. As such, and as discussed in greater detail below, the damper 122 implemented as an MR damper can be controlled to provide variable amounts of viscous drag to the ballscrew 116. In some embodiments, the damper 122 is a rotary damper acting on the ballscrew 116 through the damper gear train 126. While various embodiments disclosed herein generally relate to the use of rotary MR dampers, other dampers providing variable viscous drag may be used according to various alternative embodiments. Ideal dampers generally provide a damping torque based on the equation $T_d=K*V$, where $T_d$ is the damping torque provided by the damper, K is a damping constant, and V is rotational velocity. In one embodiment, the damper 122 provides a damping torque in accordance with non-ideal damping behavior. For example, the damper 122 may provide a damping torque based on the equation $T_d=T_0K*V$, where $T_d$ is the damping torque provided by the damper, $T_0$ is the damping torque provided at zero rotational velocity, K is a damping constant, and V is rotational velocity. The damping constant K and zero velocity damping $T_0$ may be varied based on the operational characteristics of a particular damper to accommodate a particular application.

Figure 3:
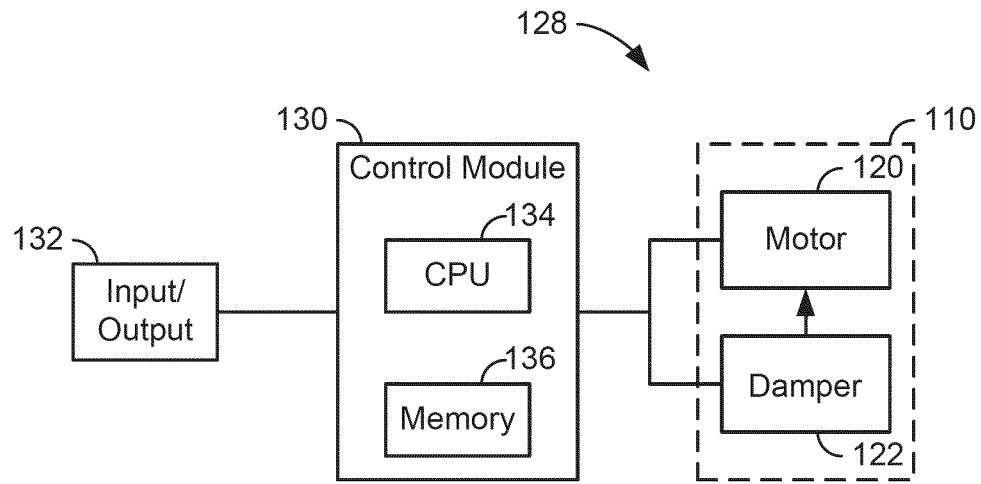
FIG. 3 is of a schematic representation of an exemplary embodiment of a control system for a stabilizer system according to the inventive concepts disclosed herein.

Referring now to FIG. 3, a control system 128 usable with the stabilizer system 100 is shown according to an exemplary embodiment. The control system 128 includes an input/output device 132 communicatively coupled to a control module 130. The control module 130 is in turn communicatively couple to the actuator mechanism 110, including the motor 120 and the damper 122. The control module 130 includes a processor 134 and a memory 136. More or fewer components may form the control system 128 according to some embodiments.

The input/output device 132 is configured to provide inputs to and receive outputs from the control module 130 and/or other components. For example, the input/output device 132 may be or include a pilot control device, an auto-pilot system, or the like, such that the input/output device 132 can provide control signals to the control module 130 to control the position of the stabilizer 102 (e.g., by control of engagement and/or disengagement of the actuator mechanism 110).

The control module 130 is configured to control operation of various components of stabilizer system 100. The processor 134 may be implemented as a specific purpose processor, an application specific integrated circuit (ASIC), one or more field programmable gate arrays (FPGAs), a group of processing components, or other suitable electronic processing components. The memory 136 is one or more devices (e.g., RAM, ROM, flash memory, hard disk storage) for storing data and computer code for completing and facilitating the various processes, layers, and modules described in the present disclosure. The memory 136 may be or include volatile memory or non-volatile memory and may include database components, object code components, script components, or any other type of information structure for supporting the various activities and information structures of the inventive concepts disclosed herein. The memory 136 is communicatively connected to the processor 134 and includes computer code or instruction modules for executing one or more processes described herein.

Referring further to FIG. 3, in one embodiment, the control module 130 is configured to vary a characteristic of the damper 122 based on the operational state of the actuator mechanism 110 or the motor 120. For example, when the actuator mechanism 110 or the motor 120 is in an active mode (e.g., enabling adjustment of the stabilizer 102), the control module 130 may control the damper 122 to provide a first level of viscous drag to the ballscrew 116. Likewise, when the actuator mechanism 110 or motor 120 is in a standby mode (e.g., when the stabilizer 102 is in a set or desired position), the control module 130 may control the damper 122 to provide a second level of viscous drag to the ballscrew 116.

In one embodiment, the first level of viscous drag is relatively low and is less than the second level of viscous drag, which may be relatively high. As such, when the actuator mechanism 110 or the motor 120 is active, the motor 120 is able to rotate the ballscrew 116 relatively free from the damping effects of the damper 122, and when the actuator mechanism 110 or motor 120 is inactive, or in standby mode, the damper 122 applies a viscous drag to the ballscrew 116 (in addition to the braking force applied by the no-back brake device 112) to prevent unwanted creep associated with the ballscrew 116. The first and second levels of viscous drag may be predetermined based on a particular application, may be manually adjusted, and/or may be determined based on current operating conditions.

Figure 4:
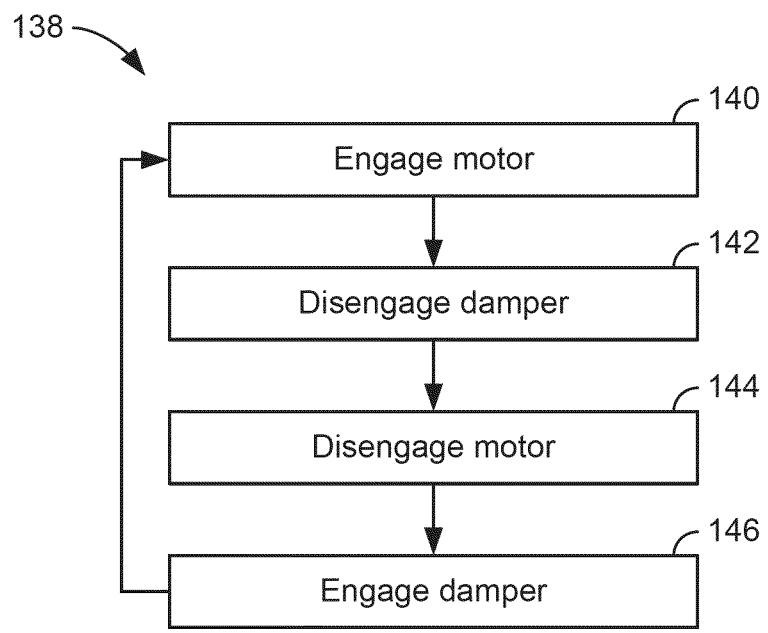
FIG. 4 is a flow chart of an exemplary embodiment of a method of controlling a stabilizer system according to the inventive concepts disclosed herein.

Referring now to FIG. 4, an exemplary embodiment of a method 138 according to the inventive concepts disclosed herein may include the following steps.

A step (140) may include engaging the motor 120. For example, the actuator mechanism 110 may be in the active state, and the motor 120 may operate to rotate the ballscrew 116, thereby adjusting the position of the stabilizer 102. Adjustment of the stabilizer 102 may be based on an operator input (e.g., a pilot providing inputs via the input/output device 132), automatically (e.g., as part of an auto-pilot program), or based on alternative forms of control.

A step (142) may include, while the actuator mechanism 110 or the motor 120 is in the active state, placing the damper 122 into a damping mode where the damper 122 provides a relatively low viscous drag on the ballscrew 116, thereby enabling relatively free adjustment of the stabilizer 102 via the ballscrew assembly 108.

A step (144) may include disengaging the actuator mechanism 110 or the motor 120. For example, the actuator mechanism 110 or motor 120 may be placed into an inactive, or standby mode, during periods of time when the position of the stabilizer 102 is set to a desired position.

A step (146) may include, while the actuator mechanism 110 or motor 120 is in an inactive or standby mode or state, placing the damper 122 into a damping mode where the damper 122 provides a relatively high viscous drag on the ballscrew 116, thereby inhibiting undesired creep of the ballscrew 116 that may result from vibrations, aerodynamic loads, etc.

As will be appreciated from the above, the systems and methods of inhibiting creep of a stabilizer system according to embodiments of the inventive concepts disclosed herein may provide benefits over typical stabilizer systems. For example, during operation of an aircraft, it is often desirable to maintain a desired position of the horizontal stabilizer. Movement of the stabilizer and associated ballscrew assembly is typically avoided in such cases. The systems and methods herein facilitate inhibiting such movement of the ballscrew assembly resulting from creep, etc.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for inhibiting no-back brake device creep, comprising:
   a motor;
   a ballscrew assembly coupled to the motor;
   a no-back brake device coupled to the ballscrew assembly; and
   at least one damper coupled to the ballscrew assembly, the at least one damper configured to vary a damping characteristic based on an operational state of the motor, wherein the at least one damper comprises a magnetorheological damper; and
   a control system coupled to the motor and the at least one damper, wherein the control system controls operation of the motor and the at least one damper such that when the motor is engaged, the at least one damper provides a relatively lower viscous drag to the ballscrew assembly, and when the motor is not engaged, the at least one damper provides a relatively higher viscous drag to the ballscrew assembly.

2. The system of claim 1, wherein the at least one damper automatically varies the damping characteristic based on the operational state of the motor.

3. The system of claim 1, wherein the damping characteristic comprises an amount of viscous drag provided by the at least one damper.

4. The system of claim 1, wherein the at least one damper comprises a rotary damper.

5. The system of claim 1, wherein the operational state of the motor comprises at least one of an active mode wherein the motor is configured to rotate the ballscrew assembly and an inactive mode.

6. The system of claim 1, wherein the at least one damper and the motor are coupled to the ballscrew assembly via a gear train assembly.

7. The system of claim 1, wherein when the motor is not engaged, the no-back brake device is configured to prevent movement of the ballscrew assembly, and the at least one damper is configured to prevent creep-related movement of the ballscrew assembly due to vibrational forces acting upon the ballscrew assembly.

8. A system for inhibiting no-back brake device creep, comprising:
   a motor;
   a ballscrew assembly coupled to the motor;
   a no-back brake device coupled to the ballscrew assembly;
   at least one damper coupled to the ballscrew assembly; and
   a control module comprising a processor coupled with a non-transitory processor-readable medium storing processor executable code for causing the processor to:
   monitor a state of the motor; and
   vary a damping characteristic of the at least one damper based on the state of the motor such that when the motor is engaged, the at least one damper provides a relatively lower viscous drag, and when the motor is not engaged, the at least one damper provides a relatively higher viscous drag.

9. The system of claim 8, wherein the state of the motor comprises at least one of an active mode wherein the motor is configured to rotate the ballscrew assembly and an inactive mode.

10. The system of claim 8, wherein the at least one damper comprises a magnetorheological damper.

11. The system of claim 10, wherein the at least one damper comprises a rotary damper.

12. The system of claim 8, wherein the at least one damper and the motor are coupled to the ballscrew assembly via a gear train assembly.

13. The system of claim 8, wherein the damping characteristic comprises an amount of viscous drag provided by the at least one damper.

14. A system for inhibiting no-back brake device creep for a no back brake device usable with an actuator to control an aircraft stabilizer, comprising:
   a ballscrew assembly configured to be coupled to the aircraft stabilizer;
   a motor coupled to the ballscrew assembly such that operation of the motor enables adjustment of a position of the aircraft stabilizer;
   a no-back brake device coupled to the ballscrew assembly;
   a magnetorheological damper coupled to the ballscrew assembly; and
   a control module configured to vary a damping characteristic of the magnetorheological damper based on a state of the motor such that when the motor is engaged, the magnetorheological damper provides a relatively lower viscous drag to the ballscrew assembly, and when the motor is not engaged, the magnetorheological damper provides a relatively higher viscous drag.

* * * * *